United States Patent
Huang et al.

(10) Patent No.: US 10,757,604 B1
(45) Date of Patent: Aug. 25, 2020

(54) METHOD AND DEVICE FOR ADAPTIVELY CONTROLLING TRAFFIC IN A MOBILE NETWORK

(71) Applicant: Verizon Patent and Licensing Inc., Arlington, VA (US)

(72) Inventors: Ye Huang, San Ramon, CA (US); Jin Yang, Orinda, CA (US); Sagiv Draznin, Walnut Creek, CA (US); Matthew W. Nelson, Pleasanton, CA (US); Miguel A. Carames, Argyle, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/441,471

(22) Filed: Jun. 14, 2019

(51) Int. Cl.
  *H04W 28/02* (2009.01)
  *H04W 28/08* (2009.01)
  *H04W 4/02* (2018.01)
  *H04W 76/11* (2018.01)
  *H04W 28/06* (2009.01)

(52) U.S. Cl.
  CPC ....... *H04W 28/0284* (2013.01); *H04W 4/025* (2013.01); *H04W 28/06* (2013.01); *H04W 28/08* (2013.01); *H04W 76/11* (2018.02)

(58) Field of Classification Search
  CPC . H04W 28/0284; H04W 76/11; H04W 4/025; H04W 28/06; H04W 28/08
  See application file for complete search history.

(56) References Cited

U.S. PATENT DOCUMENTS

| | | | |
|---|---|---|---|
| 8,103,310 B1* | 1/2012 | Srinivas | H04W 28/0247 370/329 |
| 2017/0134970 A1* | 5/2017 | Zhang | H04W 24/02 |

* cited by examiner

*Primary Examiner* — Kyaw Z Soe

(57) ABSTRACT

A device receive property data associated with a coverage area of a mobile network, wherein the property data includes identification information and location information associated with the coverage area; receive load data associated with the coverage area; determine a load threshold associated with the coverage area; determine whether the load data satisfies the load threshold; identify, based on determining that the load data satisfies the load threshold, impacted user equipment associated with the coverage area, wherein the impacted user equipment is further identified based on the property data; identify an application network device associated with the coverage area and the impacted user equipment, wherein the application network device is further identified based on the property data; determine a corrective action based on the load data, the load threshold, and the application network device; and perform the corrective action in connection with the application network device.

20 Claims, 6 Drawing Sheets

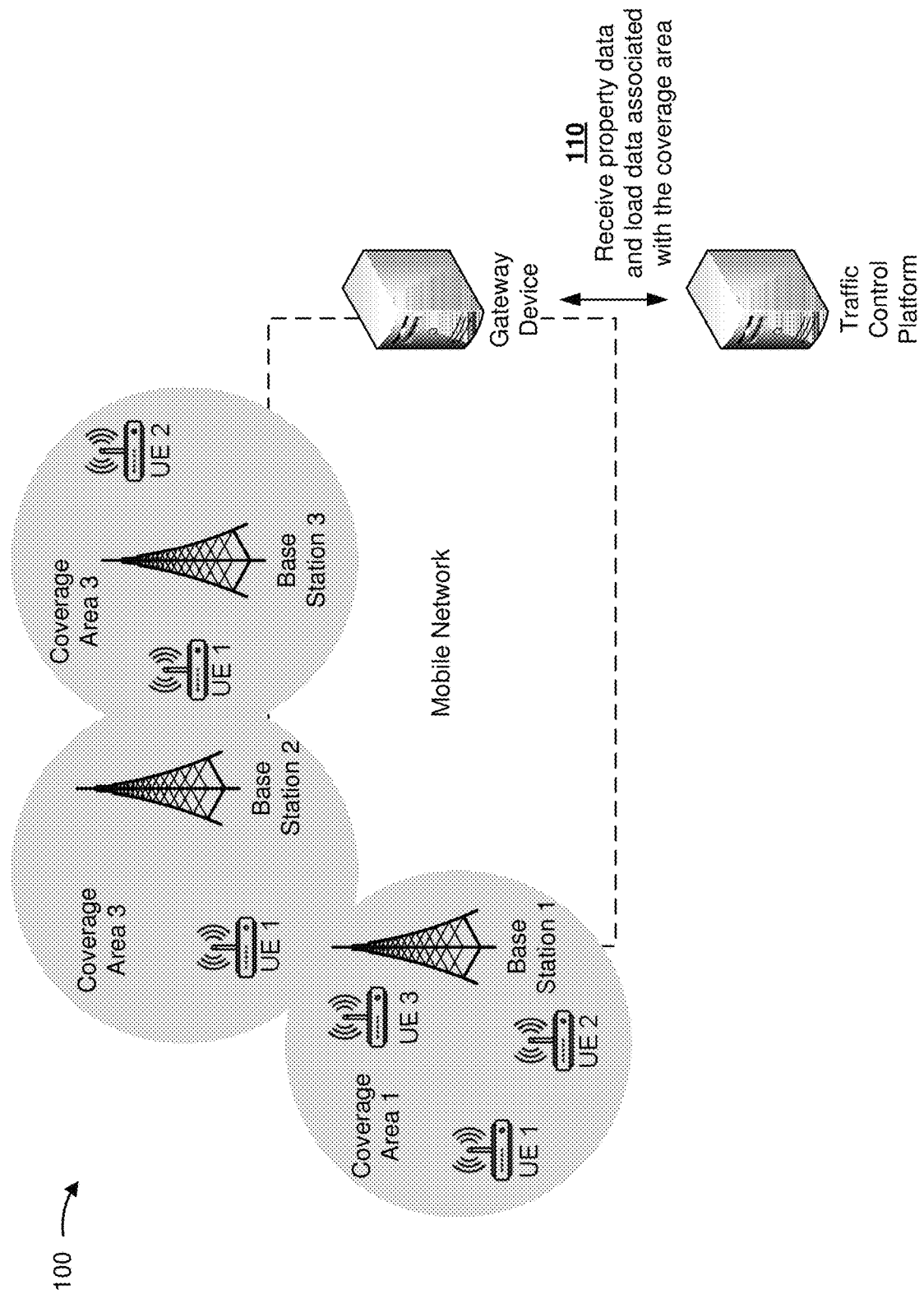

though the limited configuration of the feedback loop current traffic control solutions are limited to controlling mobile-originated (MO) traffic originating from user equipment, as opposed to mobile-terminated (MT) traffic originating from application network devices. Application network devices may account for a majority of network traffic (e.g., when simultaneously transmitting large amounts of application data, updates, and/or other content to tens of thousands of IoT devices and/or other user equipment). Current traffic control solutions do not adequately address MT traffic.

METHOD AND DEVICE FOR ADAPTIVELY CONTROLLING TRAFFIC IN A MOBILE NETWORK

BACKGROUND

A mobile network is a communication network where at least the last link is wireless. The mobile network may be distributed over coverage areas that can extend over a wide geographic area and enable a large number of portable transceivers (e.g., computers, smart phones, Internet-of-Things (IoT) devices, and/or other mobile devices) to communicate.

BRIEF DESCRIPTION OF THE DRAWINGS

FIGS. 1A-1C are diagrams of one or more example implementations described herein.

DETAILED DESCRIPTION OF PREFERRED EMBODIMENTS

Figure 1B:
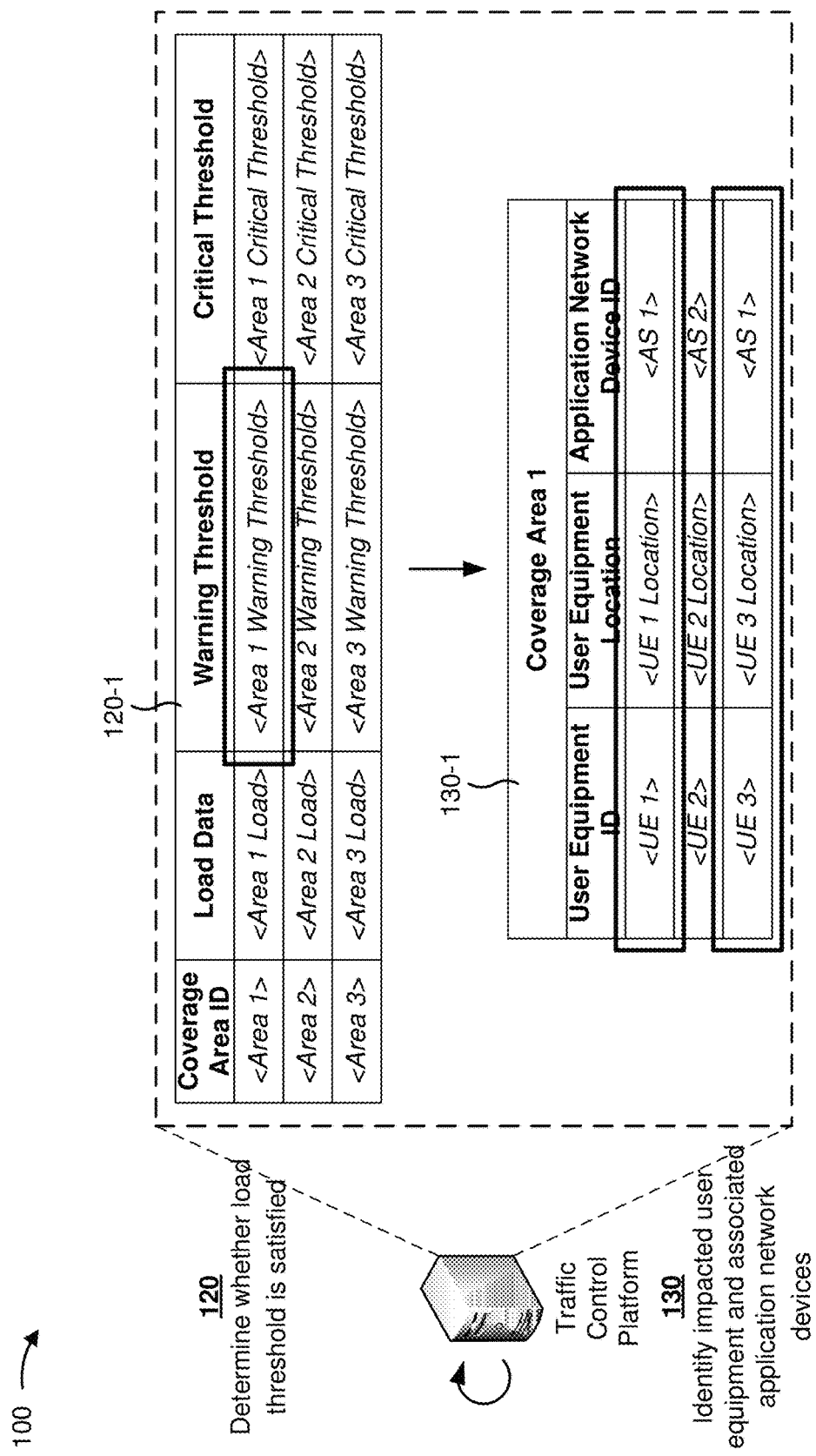

The following detailed description of example implementations refers to the accompanying drawings. The same reference numbers in different drawings may identify the same or similar elements.

As the reliance on wireless communications becomes more widespread, and as more devices or user equipment demand access to mobile networks, managing and controlling network traffic has become a growing concern. Among other things, an exponential growth of IoT applications has introduced an increasing number of user equipment which exchange data with an increasing number of counterpart application network devices providing application services to the user equipment over mobile networks. Such increases in network traffic call for more effective ways to monitor, control, and alleviate network congestion in a mobile network. Network congestion can occur when a base station associated with a coverage area simultaneously supporting multiple connections with multiple user equipment is at or beyond a load capacity of the base station. A network controller can perform certain measures to help alleviate network congestion. Although somewhat helpful, current traffic control solutions still have room for improvement.

Current traffic control solutions can use a network controller to detect network congestion via a feedback loop formed with the base station, and engage a corrective measure (e.g., a throttling, a buffering, and/or a blocking technique) that deliberately restricts certain network traffic in an attempt to alleviate network congestion. However, such solutions are passive or reactive in nature (e.g., initiating corrective measures only after a congestion event has already occurred), and do not provide proactive measures that can help avoid network congestion at the onset. Additionally, most current traffic control solutions use a static load threshold to detect whether a congestion event exists, which does not always provide flexibility to work with diverse network traffic modes (e.g., Cat-M1, Cat NB1, Cat NB-IoT, and/or the like). Furthermore, due to the limited configuration of the feedback loop current traffic control Some implementations described herein provide a traffic control platform that enables a network controller to form a more inclusive closed feedback loop, which extends between the base station and a gateway device. In particular, the traffic control platform may work in conjunction with the gateway device to map network traffic patterns, detect congestion, and perform corrective actions that address both MO and MT traffic. By providing more control over the primary source of network traffic (e.g., MT traffic), the traffic control platform is able to more effectively alleviate network congestion. Furthermore, the traffic control platform monitors for network congestion using multi-level and/or dynamic thresholds that detect early onset of network congestion before congestion actually occurs. By detecting the onset of congestion, the traffic control platform is able to initiate corrective actions earlier and avoid congestion events. In addition to throttling, buffering, and blocking traffic, the traffic control platform can also implement other corrective actions to further control congestion (e.g., notifying impacted user equipment and/or offending application network devices to reduce traffic).

In this way, the traffic control platform minimizes the occurrence of congestion within a mobile network, reduces downtime caused by network congestion, and helps maintain network devices of the mobile network operating in optimal conditions. Furthermore, the traffic control platform enables user equipment, application network devices, and/or other devices connected via the mobile network to maintain connections to faster or preferred networks. Moreover, end user devices experience fewer signal degradations, fewer signal losses, less latency, and overall better connection quality. Also, the traffic control platform leverages available network devices (e.g., gateway devices, and/or the like), thereby optimizing utilization of existing network resources and reducing the need for additional infrastructure (e.g., networking hardware, software, services, resources, and/or the like). In addition, the traffic control platform provides automated processes related to detecting and mapping network traffic patterns, which helps to conserve computational and network resources (e.g., processing resources, memory resources, power resources, communication resources, and/or the like) that may otherwise be used to analyze and track network traffic.

Figure 1C:
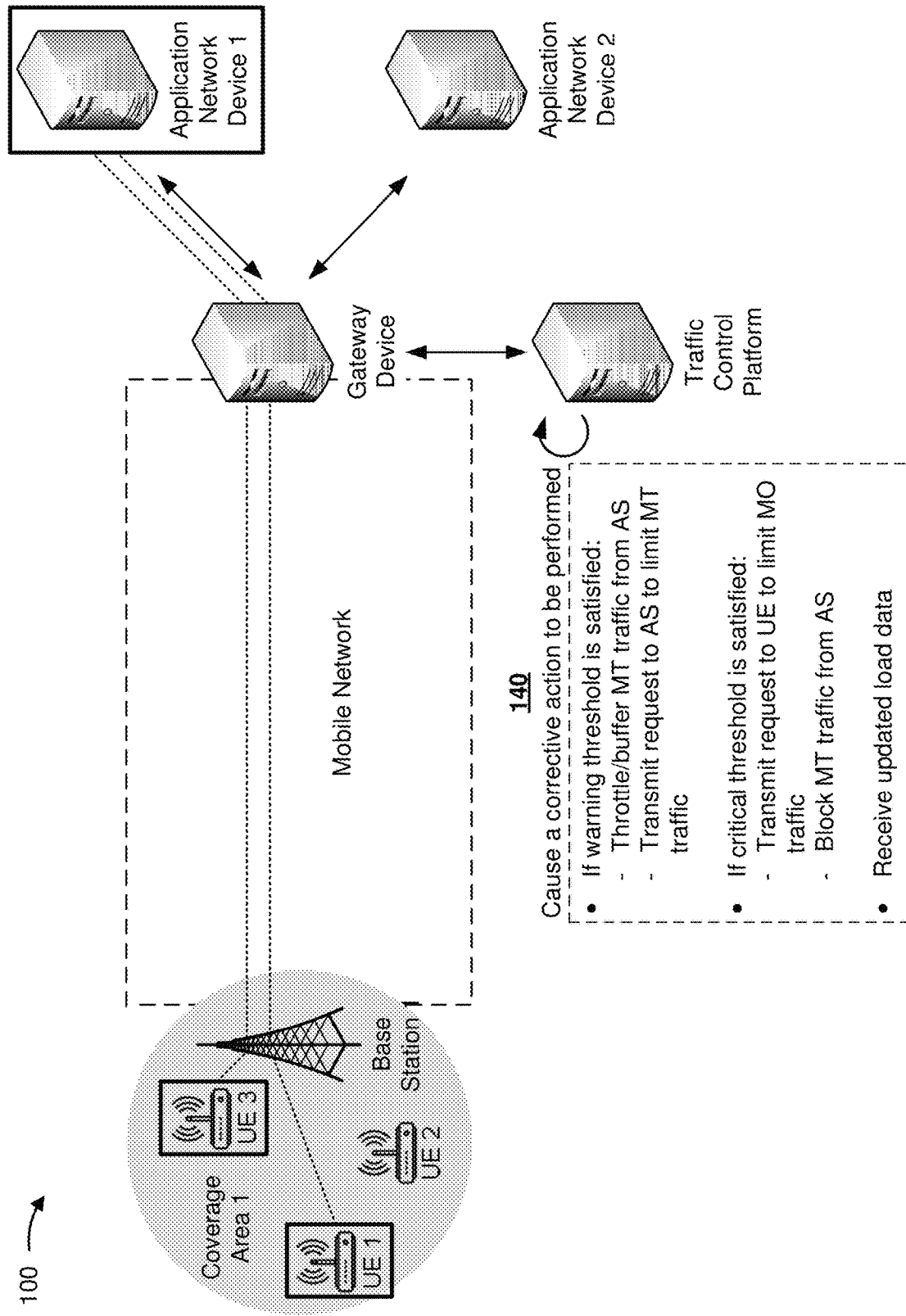

FIGS. 1A-1C are diagrams of one or more example implementations 100 described herein. As shown in FIGS. 1A-1C, the example implementation(s) 100 may include a traffic control platform, a mobile network, a coverage area, a base station, user equipment, a gateway device, and an application network device. FIGS. 1A-1C present one or more functions that may be performed by the traffic control platform to monitor traffic patterns and control congestion within a mobile network. For example, the traffic control platform may receive property data and load data associated with a coverage area, determine a load threshold associated with the coverage area, determine whether the load data satisfies the load threshold to identify congestion in the mobile network, identify user equipment impacted by the congestion and offending application network devices, determine a corrective action, and perform the corrective action to alleviate congestion. In some examples, one or more of the functions, described as being performed by the traffic control platform, may be performed by another device, such as the gateway device, the base station, the user equipment, the application network device, and/or the like.

In some implementations, the traffic control platform may operate in association with the gateway device (e.g., a packet data network gateway (PGW), a serving gateway (SGW), a user plane function (UPF), a service capability exposure function (SCEF), a network exposure function (NEF), and/or the like) to monitor and/or control traffic of the mobile network (e.g., a 2G network, a 3G network, a 4G network, a long-term evolution (LTE) network, a 5G network, a new radio (NR) network, and/or the like). The gateway device may collect information relating to a coverage area (e.g., information relating to a 5G next generation NodeB (gNB), an LTE evolved NodeB (eNB), and/or another access point of a radio access network (RAN)), user equipment (e.g., a computer, a smart phone, a mobile device, an IoT device, and/or another user device that is connected to the mobile network), an application network device, and/or the like. The information may be obtained via a registration process, an installation process, an attachment process, an onboarding process, and/or the like and maintained by a network controller (e.g., an operation, administration, and maintenance (OAM), a self-organizing network (SON), a home subscriber server (HSS), an authentication, authorization, and accounting server (AAA), and/or the like). The traffic control platform may receive the information collected by the gateway device, and store the information in a data structure on the traffic control platform, on a separate server device, and/or the like.

As shown in FIG. 1A, and by reference number 110, the traffic control platform may receive property data and load data associated with a coverage area via the gateway device of the mobile network. Property data may include information relating to one or more coverage areas (e.g., Area 1, Area 2, and/or Area 3) and/or one or more base stations (e.g., Base Station 1, Base Station 2, and/or Base Station 3) associated with the mobile network. In some examples, property data may include identification information (e.g., an identification number and/or another unique identifier of the coverage area), location information (e.g., geographical coordinates of the base station associated with the coverage area), and/or the like. In some implementations, property data may include information relating to one or more user equipment (e.g., UE 1, UE 2, and/or UE 3) associated with a particular coverage area and/or one or more application network devices providing content to the user equipment. For example, property data may include user equipment identification information (e.g., an Internet protocol (IP) address, an identification number, and/or another unique identifier of the user equipment), user equipment location information (e.g., geographical coordinates of the user equipment), application network device identification information (e.g., an IP address, a unique identifier of an application network device, and/or a unique identifier of an application onboarded by an application network device), and/or the like.

In some implementations, load data may include information relating to a load level of a particular coverage area at a particular time. For example, load data may include a number of unique user equipment simultaneously connected to the coverage area, a number of unique Radio Resource Control (RRC) connections, a number of Physical Resource Blocks (PRBs) in use, and/or another indication of the load level of the coverage area. In some cases, load data may be provided as a ratio between a number of connections in use and a number of available connections, a percentage of connections in use, and/or another indication of the capacity of the coverage area. In some implementations, information relating to a capacity limit of the coverage area may be provided by the property data, and the load data may be provided in relation to the capacity limit. The traffic control platform may receive the property data and the load data from the gateway device, store the property data and/or the load data in a data structure accessible by the traffic control platform, and update the property data and/or the load data periodically, intermittently, or continuously in real-time.

As shown in FIG. 1B, and by reference number 120, the traffic control platform may determine whether the load data satisfies one or more load thresholds to detect congestion in the mobile network. As shown, the traffic control platform may generate an index 120-1 mapping one or more coverage areas of the mobile network with corresponding property data, load data, and a load threshold. The traffic control platform may determine the load threshold for a particular coverage area based on the corresponding property data, the load data, and/or the like. The load threshold may be defined in terms of a number of unique user equipment simultaneously connected to the coverage area, a number of unique RRC connections, a number of PRBs in use, a ratio between a number of connections in use and a number of available connections, a percentage of connections in use, and/or another indication of the load threshold. For example, the load threshold may be defined based on a capacity limit of the coverage area (e.g., approximately 80% of the capacity limit of the coverage area, approximately 95% of the capacity limit of the coverage area, and/or the like).

In some implementations, the traffic control platform may determine more than one load threshold for a particular coverage area. As shown for the example in FIG. 1B, the traffic control platform may determine a first load threshold (e.g., a Warning Threshold) and a second load threshold (e.g., a Critical Threshold) that is different from the first load threshold. For example, the first load threshold may correspond to a non-critical congestion event (e.g., a lower threshold value), and the second load threshold may correspond to a critical congestion event (e.g., a greater threshold value more closely approximating a capacity limit of the coverage area). The load threshold may be the same for multiple coverage areas of the mobile network or different for each coverage area. In some cases, the load threshold may be adjustable according to an observed traffic pattern, a time of day, a time of month, a time of year, and/or another factor. The traffic control platform may store index 120-1 in a data structure that is accessible by the traffic control platform, update index 120-1 periodically, intermittently, or continuously in real-time, and automatically determine if a load threshold is satisfied.

In some implementations, the traffic control platform may compare the load data of a coverage area and a corresponding load threshold to determine whether congestion exists in the network traffic associated with the coverage area. As shown for the example in FIG. 1B, the traffic control platform may determine that the load data (e.g., Area 1 Load) corresponding to the first coverage area (e.g., Area 1) satisfies the first load threshold (e.g., Area 1 Warning Threshold). The first load threshold may correspond to a non-critical congestion event and indicative of a potential onset of congestion in the coverage area. The first load threshold may correspond to a first corrective action designed to alleviate traffic through the coverage area and avoid congestion. In some examples (e.g., if the first corrective action is inadequate to alleviate traffic through the coverage area), the load data (e.g., Area 1 Load) may satisfy the second load threshold (e.g., Area 1 Critical Threshold). The second load threshold may correspond to a critical congestion event, indicative of actual onset of congestion in the coverage area, and call for a second corrective action (e.g., different from the first corrective action) designed to alleviate congestion in the coverage area. In some implementations, the second load threshold may be inclusive of the first load threshold. In some examples, the second load threshold may be satisfied independently from the first load threshold.

As further shown in FIG. 1B, and by reference number 130, the traffic control platform may identify impacted user equipment and associated application network devices based on determining that a load threshold has been satisfied. For example, the traffic control platform may determine that the load data (e.g., Area 1 Load) corresponding to the first coverage area (e.g., Area 1) satisfies the first load threshold (e.g., Area 1 Warning Threshold) and/or the second load threshold (e.g., Area 1 Critical Threshold). In response to satisfaction of either the first load threshold or the second load threshold, the traffic control platform may identify property data corresponding to the first coverage area, and generate an index 130-1 of information relating to user equipment that are connected to the first coverage area and impacted by the congestion event, and information relating to one or more application network devices providing content to the impacted user equipment. As shown for the example in FIG. 1B, index 130-1 may identify that a first set of user equipment (e.g., UE 1 and UE 3) associated with the congested coverage area is receiving content provided by a first application network device (e.g., AS 1), and a second set of user equipment (e.g., UE 2) is receiving content provided by a second application network device (e.g., AS 2).

In some implementations, index 130-1 may include user equipment identification information (e.g., a unique identifier, an IP address, and/or the like), application network device identification information (e.g., a unique identifier, an IP address, and/or the like), and/or other information that can be used by the traffic control platform to determine an appropriate corrective action for alleviating the congestion event. For example, the traffic control platform may use the identification information (e.g., user equipment identification information, application network device identification information, and/or the like) in index 130-1 to identify traffic between individual user equipment and corresponding application network devices, and monitor the traffic via the gateway device to identify a source of the congestion. In some implementations, the traffic control platform may determine whether the traffic causing the congestion primarily originates from a specific application network device associated with the congested coverage area and/or specific user equipment within the congested coverage area. In some examples, the traffic control platform may determine whether the congested traffic is primarily MT traffic or MO traffic. If the congestion is primarily MT traffic, the traffic control platform may determine whether the MT traffic primarily originates from a specific application network device. If the congestion is primarily MO traffic, the traffic control platform may determine whether the MO traffic primarily originates from specific user equipment.

As shown for the example in FIG. 1B, the traffic control platform may determine that the primary cause of congestion to a coverage area (e.g., Area 1) is due to traffic between specific user equipment (e.g., UE 1 and UE 3) and a specific application network device (e.g., AS 1). If the traffic between the user equipment and the application network device is primarily MT traffic (e.g., traffic originating from AS 1, and directed to UE 1 and UE 3), the traffic control platform may determine a corrective action configured to specifically target the application network device and reduce the associated MT traffic. If the traffic between the user equipment and the application network device is primarily MO traffic (e.g., traffic originating from UE 1 and UE 3, and directed to AS 1), the traffic control platform may determine a corrective action configured to specifically target the user equipment and reduce the associated MO traffic. The traffic control platform may thereby identify a specific source of the congestion to address (e.g., UE 1, UE 3, and/or AS 1), and determine a corrective action that can alleviate the congestion without unnecessarily degrading or disrupting other traffic associated with the coverage area (e.g., traffic between UE 2 and AS 2) not significantly contributing to the congestion.

As shown in FIG. 1C, and by reference number 140, the traffic control platform may cause a corrective action to be performed based on the satisfied load threshold. For example, the load data of a coverage area (e.g., Area 1) may satisfy a first load threshold (e.g., Warning Threshold) corresponding to a non-critical congestion event, and indicate that MT traffic from a specific application network device (e.g., AS 1) is the primary source of the congestion. In response, the traffic control platform may cause the gateway device (e.g., a PGW, a SGW, a UPF, a SCEF, an NEF, and/or the like) to throttle MT traffic from the offending application network device (e.g., decrease a rate at which data is transferred via the MT traffic, decrease a rate at which requests from AS 1 are processed, and/or the like). The traffic control platform may cause the MT traffic to be throttled at a throttle rate suited to alleviate congestion experienced by the user equipment within the congested coverage area and/or other application network devices providing content to the congested coverage area. The throttle rate may be fixed to a particular rate, or variable based on the load data and/or other factors. For example, the traffic control platform may increase the throttle rate if updated load data indicates a decrease in congestion, or further decrease the throttle rate if the updated load data indicates an increase in congestion. The traffic control platform may receive the updated load data periodically, intermittently, or continuously in real-time.

In some implementations, the traffic control platform may cause the MT traffic to be throttled until the congestion event clears. For example, if the congestion event persists (e.g., the updated load data still satisfies the Warning Threshold), the traffic control platform may continue to cause the MT traffic to be throttled. If the congestion event clears (e.g., the updated load data does not satisfy the Warning Threshold), the traffic control platform may refrain from causing the MT traffic to be throttled. The traffic control platform may incorporate a particular delay before ending the throttling to avoid rapid state changes, or end the throttling as soon as the congestion event clears. In some implementations, the traffic control platform may cause the MT traffic to be throttled for a fixed duration and automatically stop throttling upon expiration of the fixed duration. If the congestion event persists at the expiration of the fixed duration, the traffic control platform may automatically reinitiate throttling for another fixed duration. In some implementations, the traffic control platform may cause the MT traffic to be throttled until another congestion event is triggered. For example, if the congestion worsens (e.g., the updated load data satisfies the Critical Threshold), the traffic control platform may perform another corrective action associated with a critical congestion event, as discussed further below. In some examples, the traffic control platform may stop throttling if the updated load data indicates a critical congestion event. In some examples, the traffic control platform may continue throttling if the updated load data indicates a critical congestion event.

In some implementations, the traffic control platform may cause the gateway device to buffer MT traffic from the offending application network device (e.g., temporarily store data transmitted by AS 1 and delay delivery of the data to UE 1 and UE 3) to help relieve the congestion. The traffic control platform may cause the MT traffic to be buffered as an alternative to throttling or in addition to throttling. In some examples, the traffic control platform may cause the MT traffic to be buffered and cause the MT traffic to be throttled simultaneously or at different times. The traffic control platform may cause the MT traffic to be buffered according to a buffer size suited to alleviate congestion experienced by the user equipment within the congested coverage area and/or other application network devices providing content to the congested coverage area. The buffer size may be fixed or variable based on the load data and/or other factors. In some examples, the traffic control platform may decrease the buffer size if the updated load data indicates a decrease in congestion, or increase the buffer size if the updated load data indicates an increase in congestion.

In some implementations, the traffic control platform may cause the MT traffic to be buffered until the congestion event clears. For example, if the congestion event persists (e.g., the updated load data satisfies the Warning Threshold), and if the buffer has sufficient storage, the traffic control platform may continue to cause the MT traffic to be buffered. If the congestion event persists, and if the buffer has insufficient storage, the traffic control platform may refrain from causing the MT traffic to be buffered, cause the buffered data to be discarded, and reinitiate buffering. If the congestion event clears (e.g., the updated load data does not satisfy the Warning Threshold), the traffic control platform may stop buffering the MT traffic and cause the buffered data to be delivered to the user equipment (e.g., UE 1 and UE 3). The traffic control platform may incorporate a particular delay before ending the buffering to avoid rapid state changes, or end the buffering as soon as the congestion event clears. In some implementations, the traffic control platform may cause the MT traffic to be buffered for a fixed duration and automatically stop buffering upon expiration of the fixed duration. If the congestion event persists at the expiration of the fixed duration, the traffic control platform may automatically reinitiate buffering for another fixed duration. In some implementations, the traffic control platform may cause the MT traffic to be buffered until another congestion event is triggered. For example, if the congestion worsens (e.g., the updated load data satisfies the Critical Threshold), the traffic control platform may perform another corrective action associated with a critical congestion event, as discussed further below. In some examples, the traffic control platform may stop buffering if the updated load data indicates a critical congestion event. In some examples, the traffic control platform may continue buffering if the updated load data indicates a critical congestion event.

In some implementations, the traffic control platform may transmit a request, a notification, an instruction, a command, and/or the like to the offending application network device (e.g., AS 1) to limit further MT traffic. The traffic control platform may transmit the request directly to the application network device or indirectly to the application network device via the gateway device. The traffic control platform may transmit the request as an alternative to throttling and/or buffering, or in addition to throttling and/or buffering. The request may cause the offending application network device to reduce or cease MT traffic intended for the congested coverage area (e.g., Area 1), or intended for the impacted user equipment (e.g., UE 1 and UE 3) within the congested coverage area. In some examples, the request may enable the offending application network device to automatically resume normal MT traffic upon expiration of a fixed duration. In some examples, the traffic control platform may automatically transmit the request to the application network device periodically for as long as the congestion event persists. In some examples, the request may cause the offending application network device to limit further MT traffic until a subsequent request to resume normal MT traffic is received. The traffic control platform may transmit a subsequent request to the offending application network device to resume MT traffic once the congestion event clears.

As further shown in FIG. 1C, the traffic control platform may cause another corrective action to be performed based on satisfaction of a second load threshold. For example, the load data of a congested coverage area (e.g., Area 1) may satisfy a second load threshold (e.g., Critical Threshold) corresponding to a critical congestion event, and indicate that MT traffic from a specific application network device (e.g., AS 1) is the primary source of the congestion. In some cases, a corrective action (e.g., throttling the MT traffic, buffering the MT traffic, and/or transmitting a request to the offending application network device) corresponding to the first load threshold (e.g., Warning Threshold) may not be sufficient to alleviate a non-critical congestion event. For example, the congestion associated with the coverage area (e.g., Area 1) may worsen despite the corrective action, and the updated load data may satisfy the second load threshold (e.g., Critical Threshold). In response, the traffic control platform may cause the gateway device (e.g., the PGW, the SGW, the UPF, the SCEF, the NEF, and/or the like) to block further MT traffic and discard associated data originating from the application network device (e.g., AS 1) to alleviate the congestion event.

In some implementations, the traffic control platform may continue blocking the MT traffic until the critical congestion event clears. For example, if the critical congestion event persists (e.g., the updated load data satisfies the Critical Threshold), the traffic control platform may continue blocking the MT traffic. If the critical congestion event clears (e.g., the updated load data does not satisfy the Critical Threshold), but the non-critical congestion event persists (e.g., the updated load data satisfies the Warning Threshold), the traffic control platform may stop blocking the MT traffic and initiate a corrective action associated with the non-critical congestion event (e.g., throttling, buffering, and/or transmitting a request to the offending application network device). If the critical congestion event and the non-critical congestion event clear, the traffic control platform may stop blocking the MT traffic and reenable the offending application network device to resume normal operations.

In some implementations, the traffic control platform may cause the MT traffic to be blocked for a fixed duration and automatically stop blocking the MT traffic upon expiration of the fixed duration. If the critical congestion event persists at the expiration of the fixed duration, the traffic control platform may automatically reinitiate blocking the MT traffic for another fixed duration. In some examples, if the critical congestion event persists after blocking the MT traffic, the traffic control platform may initiate a corrective action on another application network device (e.g., AS 2) associated with the congested coverage area (e.g., Area 1). For example, the traffic control platform may throttle, buffer, and/or block MT traffic originating from the second application network device and directed to other user equipment (e.g., UE 2) to further alleviate congestion in the associated coverage area.

In some implementations, the traffic control platform may transmit a request, a notification, an instruction, a command, and/or the like to the impacted user equipment (e.g., UE 1 and UE 3) to limit further MO traffic to the corresponding application network device (e.g., AS 1). The traffic control platform may transmit the request directly to the impacted user equipment or indirectly to the impacted user equipment via the gateway device. The traffic control platform may transmit the request as an alternative to blocking the MT traffic, or in addition to blocking the MT traffic. The request may cause the impacted user equipment to reduce or cease MO traffic intended for the offending application network device (e.g., AS 1). In some examples, the request may enable the impacted user equipment to automatically resume normal MO traffic upon expiration of a fixed duration. In some examples, the traffic control platform may automatically transmit the request to the impacted user equipment periodically for as long as the congestion event persists. In some examples, the request may cause the impacted user equipment to limit further MO traffic until a subsequent request to resume normal MO traffic is received. The traffic control platform may transmit a subsequent request to the impacted user equipment to resume MO traffic once the congestion event clears.

In some implementations, the traffic control platform may use a machine learning model to determine a corrective action to alleviate a congestion event within a mobile network. For example, the traffic control platform may train the machine learning model based on one or more parameters associated with a mobile network, such as property data, load data, identification information, location information, user equipment identification information, user equipment location information, application network device identification information, information relating to an application service provided by an application network device, and/or the like. The traffic control platform may train the machine learning model, according to the one or more parameters, using historical data associated with congestion events previously detected within a mobile network and the corrective actions used to alleviate the congestion events. Using the historical data and the one or more parameters as inputs to the machine learning model, the traffic control platform may determine an optimal corrective action to perform to alleviate a new congestion event.

In some implementations, the traffic control platform may train the machine learning model to associate a past congestion event with a corrective action that was effective in alleviating the past congestion event and/or a corrective action that was not effective in alleviating the past congestion event. The traffic control platform may train the machine learning model to associate one or more attributes of the past congestion event (e.g., a duration of the congestion event, a load threshold or load data associated with the congestion event, a location of the congested coverage area, a location of impacted user equipment, a type of traffic associated with the congestion event (e.g., MO traffic and/or MT traffic), and/or the like) with one or more corrective actions (e.g., throttling, buffering, blocking, transmitting a request to an application network device, transmitting a request to user equipment, and/or the like) previously used to alleviate the congestion event. The traffic control platform may train the machine learning model with a plurality of past congestion events and a corresponding plurality of corrective actions previously used to alleviate the past congestion events. The machine learning model may identify groups of congestion events with similar attributes, identify groups of similar corrective actions, and identify a pattern between the attributes of the congestion events and the corrective actions. Based on the identified pattern, the machine learning model may be able to determine a corrective action for the traffic control platform to apply to alleviate a new congestion event.

In some implementations, the traffic control platform may perform a training operation when generating the machine learning model. For example, the traffic control platform may portion one or more parameters relating to load data, property data, identification information, location information, user equipment identification information, user equipment location information, application network device identification information, information relating to an application service provided by an application network device, an attribute of a past congestion event, a corrective action that was performed and effective in alleviating the past congestion event, a corrective action that was performed and not effective in alleviating the past congestion event, and/or the like into a training set (e.g., a set of data to train the machine learning model), a validation set (e.g., a set of data used to evaluate a fit of the machine learning model and/or to fine tune the machine learning model), a test set (e.g., a set of data used to evaluate a final fit of the machine learning model), and/or the like. In some implementations, the traffic control platform may preprocess and/or perform dimensionality reduction to reduce the one or more parameters to a minimum feature set. In some implementations, the traffic control platform may train the machine learning model on this minimum feature set, thereby reducing processing to train the machine learning model, and may apply a classification technique, to the minimum feature set.

In some implementations, the traffic control platform may use a classification technique, such as a logistic regression classification technique, a random forest classification technique, a gradient boosting machine learning (GBM) technique, and/or the like, to determine a categorical outcome (e.g., that a particular corrective action has been effective in alleviating a particular type of congestion event, and/or the like). Additionally, or alternatively, the traffic control platform may use a naïve Bayesian classifier technique. In this case, the traffic control platform may perform binary recursive partitioning to split the data of the minimum feature set into partitions and/or branches and use the partitions and/or branches to perform predictions (e.g., that a particular corrective action is likely to alleviate a particular type of congestion event). Based on using recursive partitioning, the traffic control platform may reduce utilization of computing resources relative to manual, linear sorting and analysis of data points, thereby enabling use of thousands, millions, or billions of data points to train a model, which may result in a more accurate model than using fewer data points.

Additionally, or alternatively, the traffic control platform may use a support vector machine (SVM) classifier technique to generate a non-linear boundary between data points in the training set. In this case, the non-linear boundary is used to classify test data (e.g., data relating to types of corrective actions that can be implemented within a mobile network) into a particular class (e.g., a class indicating types of corrective actions that are likely to alleviate particular congestion events, a class indicating types of corrective actions that are not likely to alleviate particular congestion events, and/or the like).

Additionally, or alternatively, the traffic control platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the traffic control platform may use one or more other model training techniques, such as a neural network technique, a latent semantic indexing technique, and/or the like. For example, the traffic control platform may perform an artificial neural network processing technique (e.g., using a two-layer feedforward neural network architecture, a three-layer feedforward neural network architecture, and/or the like) to perform pattern recognition with regard to patterns of whether certain types of corrective actions described using different semantic descriptions can be used to alleviate a particular congestion event or not. In this case, using the artificial neural network processing technique may improve an accuracy of a model (e.g., the machine learning model) generated by the traffic control platform by being more robust to noisy, imprecise, or incomplete data, and by enabling the traffic control platform to detect patterns and/or trends undetectable to human analysts or systems using less complex techniques.

As an example, the traffic control platform may use a supervised multi-label classification technique to train the model. For example, as a first step, the traffic control platform may map one or more corrective actions to one or more attributes of a congestion event. In this case, the corrective actions may be characterized as effective in alleviating the congestion event or not effective in alleviating the congestion event based on characteristics of the corrective actions (e.g., whether the corrective action is associated with a primary cause of the congestion event) and an analysis of the corrective actions (e.g., by a mobile network operator and/or the like), thereby reducing processing relative to the traffic control platform being required to analyze each activity. As a second step, the traffic control platform may determine classifier chains, whereby labels of target variables may be correlated (e.g., in this example, labels may be corrective actions and correlation may refer to a common attribute of a congestion event). In this case, the traffic control platform may use an output of a first label as an input for a second label (as well as one or more input features, which may be other data relating to the congestion event), and may determine a likelihood that a particular corrective action that includes a set of characteristics (some of which are associated with a particular congestion event and some of which are not associated with the particular congestion event) are associated with the particular congestion event based on a similarity to other corrective actions that include similar characteristics. In this way, the traffic control platform transforms classification from a multilabel-classification problem to multiple single-classification problems, thereby reducing processing utilization. As a third step, the traffic control platform may determine a Hamming Loss Metric relating to an accuracy of a label in performing a classification by using the validation set of the data. For example, an accuracy with which a weighting applied to each corrective action and whether each corrective action is associated with a congestion event or not, results in a correct prediction of whether the congestion event can be alleviated by the corrective action, thereby accounting for differing amounts to which association of any one corrective action influences the ability to alleviate the congestion event. As a fourth step, the traffic control platform may finalize the machine learning model based on labels that satisfy a threshold accuracy associated with the Hamming Loss Metric and may use the machine learning model for subsequent prediction of whether certain corrective actions can effectively alleviate certain congestion events.

As another example, the traffic control platform may determine, using a linear regression technique, that a threshold percentage of corrective actions, in a set of corrective actions, do not effectively alleviate certain congestion events, and may determine that those corrective actions are to receive relatively low association scores. In contrast, the traffic control platform may determine that another threshold percentage of corrective actions are effective in alleviating certain congestion events and may assign a relatively high association score to those corrective actions. Based on the characteristics of the corrective actions that are likely to alleviate certain congestion events or not, the traffic control platform may generate the machine learning model and may use the machine learning model for analyzing new congestion events, and/or the like) that the traffic control platform identifies.

Accordingly, the traffic control platform may use any number of artificial intelligence techniques, machine learning techniques, deep learning techniques, and/or the like to monitor traffic patterns and control congestion within a mobile network. In some implementations, another device may train a machine learning model and may provide the trained machine learning model for use by the traffic control platform.

In this way, the traffic control platform provides a more comprehensive solution to monitoring and managing network traffic. The traffic control platform implements a more inclusive closed feedback loop which extends between the base station and the gateway device and, thereby, is better suited to address the primary source of network traffic (e.g., MT traffic originating from application network devices). Furthermore, the traffic control platform monitors for network congestion using multi-level and/or dynamic thresholds that detect early onset of network congestion before congestion actually occurs. By detecting the onset of congestion, the traffic control platform is able to initiate corrective actions earlier and avoid congestion events. In addition to throttling, buffering, and blocking traffic, the traffic control platform also implements other corrective actions (e.g., notifying impacted user equipment and/or offending application network devices to reduce traffic) to further control congestion.

Accordingly, the traffic control platform minimizes the occurrence of congestion within a mobile network, reduces downtime caused by network congestion, and helps maintain network devices of the mobile network operating in optimal conditions. Furthermore, the traffic control platform enables user equipment, application network devices, and/or other devices connected via the mobile network to maintain connections to faster or preferred networks. Moreover, end user devices experience fewer signal degradations, fewer signal losses, less latency, and overall better connection quality. Also, the traffic control platform leverages available network devices (e.g., gateway devices, and/or the like), thereby optimizing utilization of existing network resources and reducing the need for additional infrastructure (e.g., networking hardware, software, services, resources, and/or the like). In addition, the traffic control platform automates processes related to detecting and mapping network traffic patterns, which helps to conserve computational and network resources (e.g., processing resources, memory resources, power resources, communication resources, and/or the like) that may otherwise be used to analyze and track network traffic.

As indicated above, FIGS. 1A-1C are provided as one or more examples. Other examples can differ from what is described with regard to FIGS. 1A-1C. For example, in some implementations, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) in implementation(s) 100 may perform one or more functions described as being performed by another set of devices in implementation(s) 100.

Figure 2:
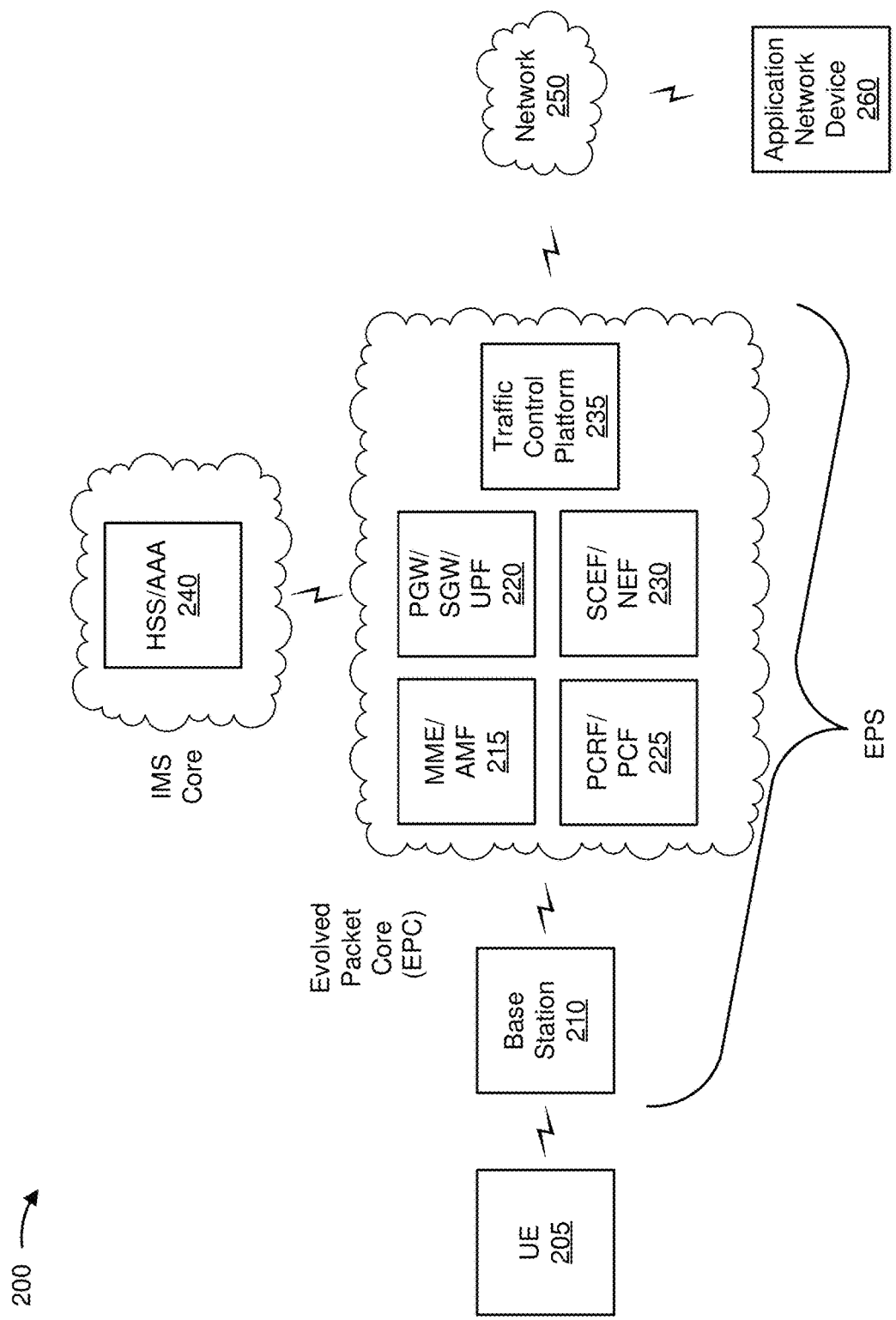
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include user equipment 205, a base station 210, a mobility management entity (MME)/access and mobility management function (AMF) 215, a PGW/SGW/UPF 220, a policy and charging rules function (PCRF)/policy control function (PCF) 225, a SCEF/NEF 230, a traffic control platform 235, an HSS/AAA 240, a network 250, and an application network device 260. Devices of environment 200 may interconnect via wired connections, wireless connections, or a combination of wired and wireless connections.

Environment 200 includes an evolved packet system (EPS) that includes an LTE network, a 5G network, and/or an evolved packet core (EPC). The EPS may include a RAN that includes one or more base stations 210 that take the form of eNBs or gNBs via which user equipment 205 communicates with the EPC. The EPC may include MME/AMF 215, PGW/SGW/UPF 220, PCRF/PCF 225, SCEF/NEF 230, and/or a traffic control platform 235 that enable user equipment 205 to communicate with network 250 and/or an Internet protocol multimedia subsystem (IMS) core. The IMS core may include HSS/AAA 240, and may manage device registration and authentication, session initiation, etc., associated with user equipment 205. HSS/AAA 240 may reside in the EPC and/or the IMS core.

User equipment 205 includes one or more devices capable of communicating with base station 210 and/or a network (e.g., network 250). For example, user equipment 205 may include a wireless communication device, an IoT device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User equipment 205 may send traffic to and/or receive traffic from network 250 (e.g., via base station 210, PGW/SGW/UPF 220, and/or PCRF/PCF 225).

Base station 210 includes one or more devices capable of transferring traffic, such as audio, video, text, and/or other traffic, destined for and/or received from user equipment 205. In some implementations, base station 210 may include an eNB or a gNB associated with the EPS that receives traffic from and/or sends traffic to network 250 via PGW/SGW/UPF 220 and/or PCRF/PCF 225. Additionally, or alternatively, one or more base stations 210 may be associated with a RAN that is not associated with the EPS. Base station 210 may send traffic to and/or receive traffic from user equipment 205 via an air interface. In some implementations, base station 210 may include a small cell base station, such as a base station of a microcell, a picocell, and/or a femtocell.

In some implementations, base station 210 may perform scheduling and/or resource management for user equipment 205 covered by base station 210 (e.g., user equipment 205 within an area covered by base station 210). In some implementations, base station 210 may be controlled or coordinated by a network controller, which can perform load balancing, network-level configuration, and/or the like. The network controller may include an OAM module or component, a SON module or component, and/or a similar module or component. The network controller may communicate with base station 210 via a wireless or wireline backhaul. In some implementations, base station 210 may include a network controller and perform network control, scheduling, and/or network management functions (e.g., for other base stations 210 and/or for uplink, downlink, and/or sidelink communications of user equipment 205 covered by base station 210). In some implementations, base station 210 may include a central unit and multiple distributed units. The central unit may coordinate access control and communication with regard to the multiple distributed units. The multiple distributed units may provide user equipment 205 and/or other base stations 210 with access to network 250.

MME/AMF 215 includes one or more devices, such as one or more server devices, capable of managing authentication, activation, deactivation, and/or mobility functions associated with user equipment 205. In some implementations, MME/AMF 215 may perform operations relating to authentication of user equipment 205. Additionally, or alternatively, MME/AMF 215 may facilitate the selection of a particular PGW/SGW/UPF 220 and/or a particular PCRF/PCF 225 to serve traffic to and/or from user equipment 205. MME/AMF 215 may perform operations associated with handing off user equipment 205 from a first base station 210 to a second base station 210 when user equipment 205 is transitioning from a first coverage area associated with the first base station 210 to a second coverage area associated with the second base station 210. Additionally, or alternatively, MME/AMF 215 may select another MME/AMF (not pictured), to which user equipment 205 should be handed off (e.g., when user equipment 205 moves out of range of MME/AMF 215).

PGW/SGW/UPF 220 includes one or more devices capable of routing packets. For example, PGW/SGW/UPF 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, PGW/SGW/UPF 220 may aggregate traffic received from one or more base stations 210 associated with the EPS, and may send the aggregated traffic to network 250 and/or other network devices associated with the EPC and/or the IMS core. PGW/SGW/UPF 220 may also receive traffic from network 250 and/or other network devices, and may send the received traffic to user equipment 205 via base station 210. Additionally, or alternatively, PGW/SGW/UPF 220 may perform operations associated with handing off user equipment 205 to and/or from an EPS.

PCRF/PCF 225 includes one or more devices capable of providing a policy framework that incorporates network slicing, roaming, packet processing, mobility management, and/or the like. Application network device 260 can determine whether user equipment 205 provides preferences for a set of network slice policies and support application influence on traffic routing, access to SCEF/NEF 230, policy control, and/or the like. MME/AMF 215 can provide authentication and authorization of user equipment 205.

SCEF/NEF 230 includes one or more devices capable of providing an interface between application network device 260 and user equipment 205. SCEF/NEF 230 may expose the services and/or capabilities of application network device 260 to user equipment 205. SCEF/NEF 230 may support the exposure of capabilities and/or events in the EPS to help other entities in the EPS discover network services and/or utilize network resources efficiently. SCEF/NEF 230 may communicate with application network device 260 via an application programming interface (API). MME/AMF 215 may communicate with SCEF/NEF 230 through a dedicated interface protocol. SCEF/NEF 230 may maintain information associating user equipment 205 with a particular HSS/AAA 240 that stores the subscriber profile for user equipment. Furthermore, SCEF/NEF 230 may manage device groups, request generation of subgroups of HSS/AAA 240 for device groups, and/or generate a mapping between a device group and corresponding subgroups of HSS/AAA 240.

Traffic control platform 235 includes one or more devices, such as one or more computer devices, capable of receiving, generating, storing, processing, and/or providing information that relates to monitoring and controlling traffic between user equipment 205 and application network device 260 (e.g., via SCEF/NEF 230), as described in further detail elsewhere herein. For example, traffic control platform 235 may receive property data and load data associated with a coverage area, determine a load threshold associated with the coverage area, determine whether the load data satisfies the load threshold to identify a congestion event, identify user equipment 205 impacted by the congestion event and associated application network device 260, determine a corrective action, and cause the corrective action to be performed to alleviate the congestion event.

HSS/AAA 240 may include one or more devices, such as one or more server devices, capable of managing (e.g., receiving, generating, storing, processing, and/or providing) information associated with user equipment 205. For example, HSS/AAA 240 may manage subscription information associated with user equipment 205, such as information that identifies a subscriber profile of a user associated with user equipment 205, information that identifies services and/or applications that are accessible to user equipment 205, location information associated with user equipment 205, a network identifier (e.g., a network address) that identifies user equipment 205, information that identifies a treatment of user equipment 205 (e.g., quality of service information, a quantity of minutes allowed per time period, a quantity of data consumption allowed per time period, etc.), and/or similar information.

In some implementations, HSS/AAA 240 may perform authentication, authorization, and/or accounting operations for communication sessions associated with user equipment 205. For example, HSS/AAA 240 may perform authentication operations for user equipment 205 and/or a user of user equipment 205 (e.g., using one or more credentials), may control access, by user equipment 205, to a service and/or an application (e.g., based on one or more restrictions, such as time-of-day restrictions, location restrictions, single or multiple access restrictions, read/write restrictions, etc.), may track resources consumed by user equipment 205 (e.g., a quantity of voice minutes consumed, a quantity of data consumed, etc.), and/or may perform similar operations. HSS/AAA 240 may provide this information to one or more other devices of environment 200 to support the operations performed by those devices.

Network 250 includes one or more wired and/or wireless networks. For example, network 250 may include a cellular network (e.g., an LTE network, a 5G network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Application network device 260 includes one or more devices, such as computer devices and/or other network devices, which receive uplink data from user equipment 205 and/or which send downlink data to user equipment 205. For example, application network device 260 may be capable of receiving location information from user equipment 205, receiving requests for instructions from user equipment 205, receiving requests for updates from user equipment 205, receiving sensor data from user equipment 205, receiving reports from user equipment 205, such as error reports and/or health status reports, and/or receiving other types of information from user equipment 205. Additionally, or alternatively, application network device 260 may be capable of sending instructions to perform a particular action by user equipment 205, sending authentication information to user equipment 205, sending a query for a particular type of information to user equipment 205, sending updates to user equipment 205, sending sensor data to user equipment 205, sending control instructions to user equipment 205, and/or sending other types of data and/or instructions to user equipment 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
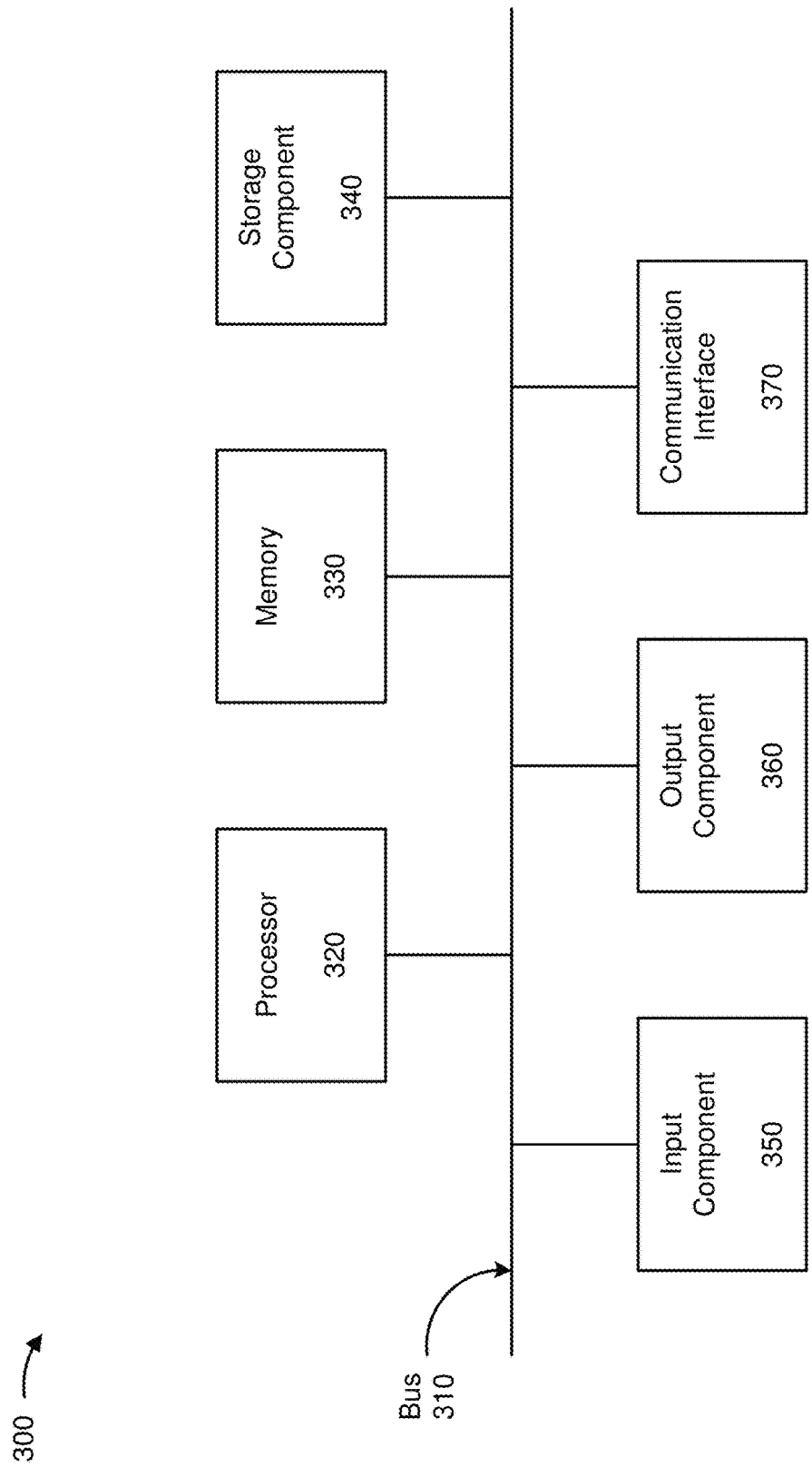
FIG. 3 is a diagram of example components of one or more devices of FIG. 2.

FIG. 3 is a diagram of example components of a device 300. Device 300 may correspond to user equipment 205, base station 210, MME/AMF 215, PGW/SGW/UFP 220, SCEF/NEF 230, traffic control platform 235, HSS/AAA 240, and/or application network device 260. In some implementations, user equipment 205, base station 210, MME/AMF 215, PGW/SGW/UFP 220, SCEF/NEF 230, traffic control platform 235, HSS/AAA 240, and/or application network device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
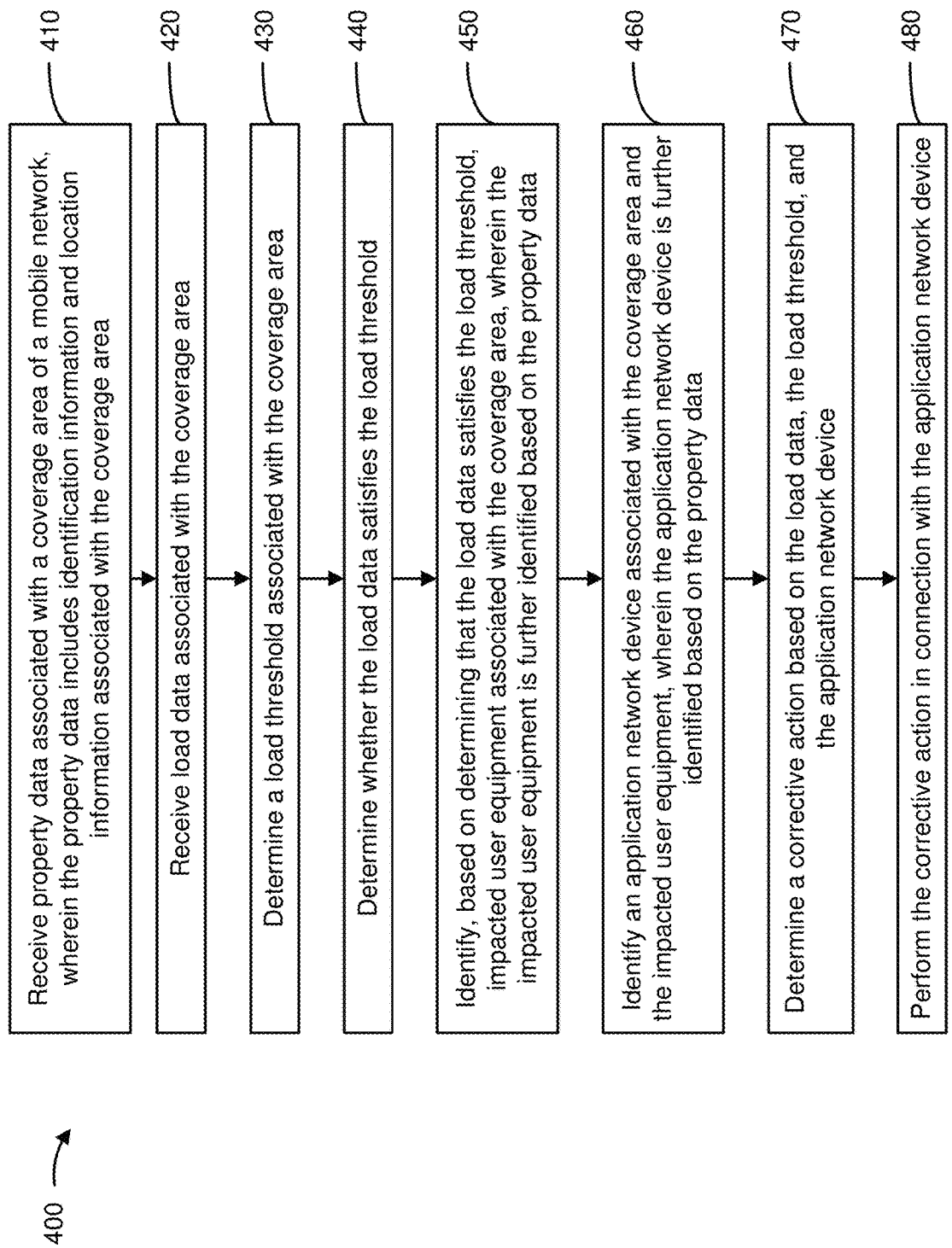
FIG. 4 is a flow chart of an example process for controlling traffic in a mobile network.

FIG. 4 is a flow chart of an example process 400 for controlling traffic in a mobile network. In some implementations, one or more process blocks of FIG. 4 may be performed by traffic control platform 235. In some implementations, one or more process blocks of FIG. 4 may be performed by another device or a group of devices separate from or including traffic control platform, such as user equipment (e.g., user equipment 205), a base station (e.g., base station 210), an MME/AMF (e.g., MME/AMF 215), a PGW/SGW/UPF (e.g., PGW/SGW/UPF 220), a PCRF/PCF (e.g., PCRF/PCF 225), a SCEF/NEF (e.g., SCEF/NEF 230), an HSS/AAA (e.g., HSS/AAA 240), or an application network device (e.g., application network device 260).

As shown in FIG. 4, process 400 may include receiving property data associated with a coverage area of a mobile network, wherein the property data includes identification information and location information (block 410). For example, the traffic control platform (e.g., using a processor 320, a memory 330, a storage component 340, an input component 350, a communication interface 370, and/or the like) may receive property data associated with a coverage area of a mobile network, as described above. In some implementations, property data may include identification information, location information, information relating to a capacity limit of the coverage area, and/or the like. In some examples, property data may include information relating to one or more user equipment associated with the coverage area and/or one or more application network devices providing content to the user equipment associated with the coverage area. For example, property data may include user equipment identification information, user equipment location information, application network device identification information, and/or the like. The property data may be updated periodically, intermittently, or continuously in real-time.

As further shown in FIG. 4, process 400 may include receiving load data associated with the coverage area (block 420). For example, the traffic control platform (e.g., using a processor 320, a memory 330, a storage component 340, a communication interface 370, and/or the like) may receive load data associated with the coverage area, as described above. In some implementations, load data may include information relating to a load level of the coverage area at a particular time. For example, load data may include a number of unique user equipment simultaneously connected to the coverage area, a number of unique RRC connections, a number of PRBs in use, and/or another indication of the load level of the coverage area. In some cases, load data may be provided as a ratio between a number of connections in use and a number of available connections, a percentage of connections in use, and/or another indication of the capacity of the coverage area. The load data may be updated periodically, intermittently, or continuously in real-time.

As further shown in FIG. 4, process 400 may include determining a load threshold associated with the coverage area (block 430). For example, the traffic control platform (e.g., using a processor 320, a memory 330, a storage component 340, a communication interface 370, and/or the like) may determine a load threshold associated with the coverage area, as described above. In some implementations, the traffic control platform may generate an index mapping the coverage area with the corresponding load threshold, property data, and load data. The load threshold may be determined based on the corresponding property data, the load data, and/or the like. The load threshold may be defined in terms of a number of unique user equipment simultaneously connected to the coverage area, a number of unique RRC connections, a number of PRBs in use, a ratio between a number of connections in use and a number of available connections, a percentage of connections in use, and/or another indication of the load threshold. For example, the load threshold may be defined based on a capacity limit of the coverage area. In some implementations, the traffic control platform may determine more than one load threshold for the coverage area. For example, the traffic control platform may determine a first load threshold corresponding to a non-critical congestion event and a second load threshold corresponding to a critical congestion event. The load threshold may be the same for multiple coverage areas of the mobile network or different for each coverage area. In some cases, the load threshold may be adjustable according to an observed traffic pattern, a time of day, a time of month, a time of year, and/or another factor.

As further shown in FIG. 4, process 400 may include determining whether the load data satisfies the load threshold (block 440). For example, the traffic control platform (e.g., using a processor 320, a memory 330, a storage component 340, and/or the like) may determine whether the load data satisfies the load threshold, as described above. In some implementations, the traffic control platform may compare the load data and the corresponding load threshold to determine whether congestion exists in the network traffic associated with the coverage area. If multiple load thresholds are provided, the traffic control platform may compare the load data with each of the load thresholds. One load threshold may be inclusive of another load threshold, or each load threshold may be independently satisfied.

As shown in FIG. 4, process 400 may include identifying, based on determining that the load data satisfies the load threshold, impacted user equipment associated with the coverage area, wherein the impacted user equipment is further identified based on the property data (block 450). For example, the traffic control platform (e.g., using a processor 320, a memory 330, a storage component 340, a communication interface 370, and/or the like) may identify, based on determining that the load data satisfies the load threshold, impacted user equipment associated with the coverage area, as described above. In some implementations, the impacted user equipment is further identified based on the property data. For example, the traffic control platform may identify property data corresponding to the coverage area, and generate an index of information relating to user equipment that are connected to the coverage area and impacted by the congestion. The index may include user equipment identification information, user equipment location information, and/or the like.

As shown in FIG. 4, process 400 may include identifying an application network device associated with the coverage area and the impacted user equipment, wherein the application network device is further identified based on the property data (block 460). For example, the traffic control platform (e.g., using a processor 320, a memory 330, a storage component 340, a communication interface 370, and/or the like) may identify an application network device associated with the coverage area and the impacted user equipment, as described above. In some implementations, the application network device is further identified based on the property data. For example, the traffic control platform may identify property data corresponding to the coverage area, and generate an index of information relating to the application network device providing content to the impacted user equipment. For example, the index may include application network device identification information, and/or the like.

As further shown in FIG. 4, process 400 may include determining a corrective action based on the load data, the load threshold, and the application network device (block 470). For example, the traffic control platform (e.g., using a processor 320, a memory 330, a storage component 340, a communication interface 370, and/or the like) may determine a corrective action based on the load data, the load threshold, and the application network device, as described above. If multiple load thresholds are provided, the traffic control platform may determine the corrective action corresponding to the load threshold that was satisfied. For example, a first load threshold may correspond to a non-critical congestion event and indicative of a potential onset of congestion in the coverage area. The first load threshold may call for a first corrective action designed to alleviate traffic through the coverage area and avoid congestion. A second load threshold may correspond to a critical congestion event and indicative of actual onset of congestion in the coverage area. The second load threshold may and call for a second corrective action designed to alleviate congestion in the coverage area.

As further shown in FIG. 4, process 400 may include performing the corrective action in connection with the application network device (block 480). For example, the traffic control platform (e.g., using a processor 320, a memory 330, a storage component 340, an output component 360, a communication interface 370, and/or the like) may perform the corrective action in connection with the application network device, as described above. If the satisfied load threshold corresponds to a non-critical congestion event, the traffic control platform may cause a corrective action which throttles MT traffic originating from the application network device, buffers MT traffic originating from the application network device, and/or transmits a request, a notification, an instruction, a command, and/or the like to the application network device to limit further MT traffic. If the satisfied load threshold corresponds to a critical congestion event, the traffic control platform may cause a corrective action which restricts MT network traffic from the application network device, blocks MT traffic originating from the application network device, and/or transmits a request, a notification, an instruction, a command, and/or the like to the impacted user equipment to limit further MO traffic from the impacted user equipment.

In some implementations, the traffic control platform may continue enforcing the corrective action and restricting the associated network traffic until the congestion event is alleviated. For example, the traffic control platform may receive updated load data after performing the corrective action, and determine whether the updated load data continues to satisfy one of the load thresholds. If the updated load data continues to satisfy one of the load thresholds, the traffic control platform may cause the corrective action corresponding to the satisfied load threshold to be performed. If the updated load data no longer satisfies any of the load thresholds, the traffic control platform may end the corrective action, and continue monitoring for additional congestion events. The traffic control platform may receive the updated load data periodically, intermittently, or continuously in real-time. In some implementations, the traffic control platform may continue enforcing the corrective action for a preset duration of time before ending the corrective action and/or before receiving updated load data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a device, property data associated with a coverage area of a mobile network,
        wherein the property data includes identification information and location information associated with the coverage area;
    receiving, by the device, load data associated with the coverage area;
    determining, by the device, a load threshold associated with the coverage area;
    determining, by the device, whether the load data satisfies the load threshold;
    identifying, by the device and based on determining that the load data satisfies the load threshold, impacted user equipment associated with the coverage area,
        wherein the impacted user equipment is further identified based on the property data;
    identifying, by the device, an application network device associated with the coverage area and the impacted user equipment,
        wherein the application network device is further identified based on the property data;
    determining, by the device, a corrective action based on the load data, the load threshold, and the application network device; and
    performing, by the device, the corrective action in connection with the application network device.

2. The method of claim 1, wherein determining the load threshold comprises:
    determining a first load threshold and a second load threshold based on a capacity limit of the coverage area,
        wherein the first load threshold approximates the capacity limit and corresponds to a first corrective action, and
        wherein the second load threshold is less than the first load threshold and corresponds to a second corrective action.

3. The method of claim 1, wherein determining the corrective action comprises:
    determining a first corrective action corresponding to satisfaction of a first load threshold,
        wherein the first load threshold approximates a capacity limit of the coverage area; and
    determining a second corrective action corresponding to satisfaction of a second load threshold,
        wherein the second load threshold is less than the first load threshold.

4. The method of claim 1, wherein performing the corrective action comprises:
throttling mobile-terminated network traffic originating from the application network device; and
transmitting a request to the application network device to limit mobile-terminated network traffic originating from the application network device.

5. The method of claim 1, wherein performing the corrective action comprises:
buffering mobile-terminated network traffic originating from the application network device; and
transmitting a request to the application network device to limit mobile-terminated network traffic originating from the application network device.

6. The method of claim 1, further comprising:
receiving updated load data after performing the corrective action;
determining whether the updated load data satisfies the load threshold; and
ending the corrective action based on determining that the updated load data does not satisfy the load threshold.

7. A device, comprising:
one or more memories; and
one or more processors, communicatively coupled to the one or more memories, to:
receive property data associated with a coverage area of a mobile network;
receive load data associated with the coverage area;
determine a first load threshold and a second load threshold associated with the coverage area;
determine whether the load data satisfies one or more of the first load threshold or the second load threshold;
identify, based on determining that the load data satisfies one or more of the first load threshold or the second load threshold, impacted user equipment associated with the coverage area;
identify an application network device associated with the coverage area and the impacted user equipment; and
selectively perform a first corrective action or a second corrective action in connection with the application network device,
wherein the first corrective action is to be performed in connection with the application network device based on determining that the load data satisfies the first load threshold,
wherein the second corrective action is to be performed in connection with the application network device based on determining that the load data satisfies the second load threshold,
wherein the second corrective action is different from the first corrective action.

8. The device of claim 7, wherein the property data includes at least two of:
identification information associated with the coverage area,
location information associated with the coverage area,
user equipment identification information,
user equipment location information, or
application network device information.

9. The device of claim 7, wherein the load data includes:
a number of user equipment in the mobile network and connected to the coverage area.

10. The device of claim 7, wherein the one or more processors, when determining the first load threshold and the second load threshold, are to:
determine the first load threshold and the second load threshold based on a capacity limit of the coverage area,
wherein the first load threshold approximates the capacity limit, and
wherein the second load threshold is less than the first load threshold.

11. The device of claim 7, wherein the one or more processors, when identifying the application network device, are to:
identify the application network device based on application network device information,
wherein the property data includes the application network device information.

12. The device of claim 7, wherein the one or more processors, when performing the first corrective action, are to:
transmit a request to the impacted user equipment to limit mobile-originated network traffic originating from the impacted user equipment; and
block mobile-terminated network traffic originating from the application network device.

13. The device of claim 7, wherein the one or more processors, when performing the second corrective action, are to:
throttle mobile-terminated network traffic originating from the application network device;
buffer mobile-terminated network traffic originating from the application network device; and
transmit a request to the application network device to limit mobile-terminated network traffic originating from the application network device.

14. The device of claim 7, wherein the one or more processors are further to:
receive updated load data after performing the first corrective action or the second corrective action;
determine whether the updated load data satisfies one of the first load threshold or the second load threshold; and
end the first corrective action or the second corrective action based on determining that the updated load data does not satisfy the second load threshold.

15. A non-transitory computer-readable medium storing instructions, the instructions comprising:
one or more instructions that, when executed by one or more processors, cause the one or more processors to:
receive property data associated with a coverage area of a mobile network,
wherein the property data includes identification information and location information associated with the coverage area;
receive load data associated with the coverage area;
determine a load threshold associated with the coverage area;
determine whether the load data satisfies the load threshold;
identify, based on determining that the load data satisfies the load threshold, impacted user equipment associated with the coverage area,
wherein the impacted user equipment is further identified based on the property data;
identify an application network device associated with the coverage area and the impacted user equipment,
wherein the application network device is further identified based on the property data; and
restrict network traffic originating from the application network device.

16. The non-transitory computer-readable medium of claim 15, wherein the property data further includes:
   user equipment identification information,
   user equipment location information, and
   application network device information.

17. The non-transitory computer-readable medium of claim 15, wherein the one or more instructions, that cause the one or more processors to restrict the network traffic, cause the one or more processors to:
   throttle mobile-terminated network traffic originating from the application network device; and
   transmit a request to the application network device to limit mobile-terminated network traffic originating from the application network device.

18. The non-transitory computer-readable medium of claim 15, wherein the one or more instructions, that cause the one or more processors to restrict the network traffic, cause the one or more processors to:
   buffer mobile-terminated network traffic originating from the application network device; and
   transmit a request to the application network device to limit mobile-terminated network traffic originating from the application network device.

19. The non-transitory computer-readable medium of claim 15, wherein the one or more instructions, that cause the one or more processors to restrict the network traffic, cause the one or more processors to:
   transmit a request to the impacted user equipment to limit mobile-originated network traffic originating from the impacted user equipment; and
   block mobile-terminated network traffic originating from the application network device.

20. The non-transitory computer-readable medium of claim 15, wherein the one or more instructions, that cause the one or more processors to restrict the network traffic, cause the one or more processors to:
   restrict the network traffic until the load data no longer satisfies the load threshold.

\* \* \* \* \*